Patented Mar. 7, 1950

2,499,927

UNITED STATES PATENT OFFICE 2,499,927

DEMULSIFICATION OF WATER-NITRO-XYLENE EMULSION

Arthur E. Martin, Bellflower, Calif., assignor to Shell Development Company, San Francisco, Calif., a corporation of Delaware No Drawing. Application April 17, 1948,
Serial No. 21,749

5 Claims. (Cl. 260—645)

This invention relates to the de-emulsification of unusually stable emulsions of water-insoluble cyclic nitro compounds.

It is an object of this invention to provide a highly advantageous process for de-emulsifying persistent aqueous emulsions of cyclic nitro compounds. Another object is to break stable emulsions which are formed during water-washing of cyclic nitro compounds.

The present invention, which includes de-emulsification as a step thereof, pertains to the production and purification of water-insoluble cyclic nitro compounds. These compounds are usually produced by nitration of a technical cyclic hydrocarbon fraction containing minor amounts of cyclic hydroxy or phenolic compounds. The reaction product is predominantly cyclic nitro compounds, but also contains small amounts of by-product organic acids; the latter are mainly nitro cyclic hydroxy compounds. Following nitration, the reaction product is given a conventional washing treatment with water to remove the inorganic acids used in the nitration, and the product is subjected to a treatment with an aqueous alkaline agent to neutralize and separate said by-product organic acids. The resultant substantially purified water-insoluble organic phase is then water-washed. However, in the present case it was found that an extremely persistent emulsion between the water and at least a substantial part of the cyclic nitro compounds was produced in this last water-washing step. This emulsion is of the type in which the water is the continuous phase.

In accordance with this invention, it has been discovered that following the above sequence of steps, the aforesaid stable emulsion may be broken by intimately contacting or agitating it with a water-soluble inorganic basic-acting agent added as a solid or in the relatively dry state. The latter agent is employed in an amount sufficient to effect de-emulsification, said amount being also sufficient to cause an increase in the specific gravity of the aqueous phase of the emulsion to a value higher than that of the nitro cyclic compounds to be recovered. The de-emulsification is followed by separation of the supernatant nitrocyclic compounds from the aqueous phase.

The aforesaid basic-acting agents are water-soluble inorganic compounds of alkali metals, preferably inorganic alkali metal salts, such as the alkali metal carbonates, although the corresponding phosphates and borates may also be employed. The preferred agents will be referred to as "alkaline inorganic salts." These alkaline inorganic salts are most effective when employed as comminuted solids or in anhydrous or substantially anhydrous form.

A special feature of this invention is the discovery that the inorganic alkaline salts, especially the carbonates, are superior in effectiveness when employed in the de-emulsification step as a solid, substantially dry powder. Such use effects a much more rapid breaking of the emulsion.

The amount of the present agents used in the instant type of de-emulsification is generally from about 10 to about 30 parts by weight per 100 parts of water present in the emulsion. The amount to be added depends on the temperature. For example, at room temperature the added amount must form a nearly saturated solution of salt in the separated water phase, while at 90° C. good separation can be obtained if the salt is present in the separated water phase at a much lower concentration. The criterion is the addition of sufficient salt at the existing temperature so as to form a water phase which will have a specific gravity appreciably higher than that of the nitro cyclic compound.

The term "cyclic nitro compounds" means liquid nitro carbocyclic and heterocyclic compounds having the —$NO_2$ group attached directly to a cyclic structure of at least five atoms in the ring. Representative compounds include particularly nitrobenzene, dinitrobenzenes, nitrotoluenes, nitronaphthalenes, nitro-halogen-benzenes, nitrothiophenes, nitroxylenes, nitrocyclopentane, nitropyridine, as well as their alkylated homologues.

The emulsion, when formed, can be either withdrawn as a separate emulsion layer and treated separately, or the emulsion may be treated in situ in the presence of a partially separated cyclic nitro compound phase. It is preferred to continuously or intermittently withdraw the emulsion layer and treat the emulsion separately with an inorganic basic-acting agent.

The present invention effects an unusually rapid de-emulsification of the present type of stable emulsions. By this invention, such an emulsion is broken completely in a matter of a few hours, generally not more than about eight hours being required, even in the most extreme cases. This occurs even though intimate contacting of the agent and the emulsion is effected below 100° C. and even at room temperature.

A particularly advantageous modified form or feature of this invention is that it may be and preferably is operated as a continuous process. The alkaline aqueous phase separated from the de-emulsification step is recycled either in part or entirely to the prior neutralizing step to neutralize at least a substantial portion of the above-described by-product organic acids present in incoming unneutralized reaction product.

Continuous operation is also preferred because the emulsion is continuously withdrawn and deemulsified shortly after the emulsion formation. By this means the stable emulsion is broken with greater relative ease since it does not undergo compaction and further increase in stability due to storage.

As an illustration, a specific embodiment of the invention is described below.

A crude mono-nitroxylene reaction product was prepared by nitration with nitric acid of a mixture of xylenes containing a minor amount of xylenols. The reaction product was washed with water and inorganic acidic material was for the most part thereby removed. The resultant, as yet unneutralized, reaction product was separated; it contained minor amounts of nitrophenolic substances, such as nitro xylenols and toluic acid. These by-product organic acidic materials were neutralized at about 90° C. by intimately contacting the preheated product with about 50% of its own volume of a hot 20% by weight sodium carbonate solution.

The resultant aqueous phase was separated from the thus-neutralized reaction product. The remaining nitroxylene phase retains too high a concentration of sodium nitro-phenolate type of salts; these salts are explosive and are dangerous in any subsequent distillation. The separated nitroxylene phase is washed with water at about 90° C. to remove additional amounts of the objectionable phenolate salts and additional quantities of other by-products. During this water-washing step, a stable emulsion of the type described herein, is formed. To obtain faster washing action, the wash water was at about 90° C., although a stable emulsion forms in varying amounts irrespective of the particular washing temperature. This emulsion generally contains 2 wt. per cent or more of the total nitroxylene. The nitroxylene content of the emulsion ranges from about 35% to about 65% in different instances.

The thus-formed stable emulsion accumulates at the top of the nitroxylene in any separator or storage vessel and is separated as such. When portions of the emulsion were boiled for long periods of time or were treated with organic solvents, only slight or no de-emulsification resulted, while treatment with such diverse materials as sulfonic acid or aluminum were ruled out because of corrosion and contamination problems. However, intimately contacting the persistent emulsion with dry powdered sodium carbonate effected quick and complete separation of a nitroxylene phase and an aqueous sodium carbonate phase from the emulsion. In some cases a third phase of resinous material gathered at the interface. The de-emulsification was conducted at temperatures from about 20° C. up to about the boiling temperature of water, i. e. about 100° C. Excellent results were obtained between about 40° C. and about 50° C. On settling, the alkaline aqueous phase separated as the lower layer which can be recycled to the first alkaline wash step after adjustment to the proper alkalinity.

The resultant separated nitroxylene phase from the broken emulsion was removed. It was clear and substantially anhydrous, i. e. there was less than about 0.3 wt. per cent of water therein. this recovered and purified nitroxylene phase was found safe and suitable for distillation.

I claim as my invention:

1. The process of recovering mono-nitroxylene from a persistent and stable, substantially neutral, emulsion thereof with water, said emulsion containing from about 35 to 65% by weight of nitroxylene, which comprises intimately contacting said emulsion at a temperature of from about 35° C. to about 100° C. with from about 10 to 30% by weight, based on the water content of said emulsion, of solid sodium carbonate, in amount selected to produce an aqueous solution with the water content of the emulsion having a specific gravity greater than that of the nitroxylene under the conditions of the contacting, thereby effecting de-emulsification, and recovering a separated phase of nitroxylene.

2. The process of recovering mono-nitroxylene from a stable, substantially neutral, aqueous emulsion thereof which comprises intimately contacting said emulsion, at a temperature above the melting point of said nitroxylene, with solid sodium carbonate in an amount sufficient to form a solution with the water content of said emulsion, having a greater specific gravity than said nitroxylene under the conditions of said contacting, thereby effecting de-emulsification and recovering a separated nitroxylene phase.

3. The process of recovering a relatively water-insoluble and aqueous alkali-insoluble nitroaromatic hydrocarbon from a stable, substantially neutral, aqueous emulsion thereof which comprises intimately contacting said emulsion, at a temperature above the melting point of the nitroaromatic hydrocarbon, with a solid alkali metal carbonate in an amount sufficient to form a solution with the water content of said emulsion having a greater specific gravity than said nitroaromatic hydrocarbon at the temperature of said contacting, thereby effecting de-emulsification and recovering a separated nitroaromatic hydrocarbon phase.

4. The process of recovering a relatively water-insoluble and aqueous alkali-insoluble nitroaromatic compound from a stable, substantially neutral, aqueous emulsion thereof which comprises intimately contacting said emulsion at a temperature above the melting point of said nitroaromatic compound with a water-soluble inorganic alkaline agent in an amount sufficient to form a solution with the water content of said emulsion, having a greater specific gravity than said nitroaromatic compound at the temperature of the contacting, thereby effecting de-emulsification and recovering a separated phase of said nitroaromatic compound.

5. The process of recovering a relatively water-insoluble and aqueous alkali-insoluble-nitro-hydrocarbon from a stable, substantially neutral, aqueous emulsion thereof which comprises intimately contacting said emulsion, at a temperature above the melting point of said nitro-hydrocarbon, with a water-soluble inorganic alkaline agent in an amount sufficient to form a solution with the water content of said emulsion having a greater specific gravity than said nitro-hydrocarbon, at the temperature of said contacting, thereby effecting de-emulsification and recovering a separated nitro-hydrocarbon phase.

ARTHUR E. MARTIN.

REFERENCES CITED

The following references are of record in the file of this patent:

UNITED STATES PATENTS

| Number | Name | Date |
|---|---|---|
| 2,145,200 | McCreary | Jan. 24, 1939 |
| 2,382,133 | Chambers et al. | Aug. 14, 1945 |
| 2,400,904 | Batchelder et al. | May 28, 1946 |